United States Patent [19]

Uram, Jr.

[11] 4,343,857

[45] Aug. 10, 1982

[54] COATINGS FOR OPTICAL SYSTEMS

[75] Inventor: John Uram, Jr., Glendale, Ariz.

[73] Assignee: Goodyear Aerospace Corporation, Akron, Ohio

[21] Appl. No.: 936,320

[22] Filed: Aug. 23, 1978

[51] Int. Cl.³ .................. B32B 27/08; G02B 1/04; G02B 1/10; G02C 7/02
[52] U.S. Cl. .................. 428/336; 350/409; 351/166; 427/162; 427/164; 428/331; 428/339; 428/412; 428/413; 428/446; 428/447; 428/451
[58] Field of Search ............... 427/162-169; 428/336, 339, 413, 417, 447, 451, 331, 412, 446; 350/409; 351/166

[56] References Cited

U.S. PATENT DOCUMENTS

| | | | |
|---|---|---|---|
| 3,707,397 | 12/1972 | Gagnon | 427/163 X |
| 3,713,880 | 1/1973 | Krekeler | 427/162 |
| 3,719,629 | 3/1973 | Martin et al. | 260/33.2 EP |
| 3,772,870 | 11/1973 | Wong et al. | 427/163 X |
| 3,953,115 | 4/1976 | French et al. | 427/164 X |
| 4,029,842 | 6/1977 | Yoshida et al. | 427/164 X |
| 4,120,992 | 10/1978 | Laurin et al. | 427/164 |

*Primary Examiner*—Bruce H. Hess
*Attorney, Agent, or Firm*—P. E. Milliken; E. W. Oldham; D. J. Hudak

[57] ABSTRACT

A coating for optical members such as acrylic or polycarbonate comprising prehydrozyled alkyl silicate, polysilicic acid and monocarboxylic acid dispersed in an aqueous vinyl interpolymer and an epoxy binder containing a filler of fumed silica or aluminum oxide and a silane.

8 Claims, No Drawings

COATINGS FOR OPTICAL SYSTEMS

The Government has rights in this invention, pursuant to Contract No. DAAJO2-76-C-0004 by the Department of the Army.

This invention relates to an improved coating composition. More particularly this invention relates to coating compositions for optical systems.

The U.S. defense forces have attempted to use systems similar to those of U.S. Pat. Nos. 3,751,326 and 3,846,161 to harden transparent sheet materials but these compositions were highly susceptible to humidity conditions. Therefore the U.S. Army requested bids on improved formulations, resulting in Army Contract DAAJO2-76-C-0004 under which this invention was developed. An object of this invention is to provide a coating composition which is hydrolytically stable.

The objects of this invention are accomplished by blending together the ingredients hereinafter named to give a mixture having relatively long dispersion life until the solvent evaporates and allows the reactants to cure to a hydrolytically stable composition, preferably on a suitable optical member. Broadly this invention comprises a hydrolytic, hard, transparent coating on an optical member comprising an optical member having a coating of 1 to 10 microns thereon, said coating comprising a cured composition formed from a dispersion coating of a mixture of 0 to 30 parts and preferably 0.5 to 25 parts of prehydrolyzed alkyl silicate, where said alkyl radical contains 1 to 10 carbon atoms, 0 to 30, and preferably 0.5 to 25, parts of polysilicic acid, 0 to 50, and preferably 0.5 to 35, parts of a monocarboxylic acid having 1 to 2 carbon atoms, 0 to 50, preferably 1 to 35, parts of water, 1 to 5 parts of a silane selected from the class consisting of chloropropyltrimethoxysilane
vinyltrichlorosilane
vinyltriethoxysilane
vinyl-tris(2-methoxyethoxy)silane
gamma-methacryloxypropyltrimethoxysilane
gamma-methacryloxypropyl-tris-(2-methoxyethoxy)-silane
beta-(3,4-epoxycyclohexyl)-ethyltrimethoxysilane
gamma-glycidoxypropyltrimethoxysilane
vinyltriacetoxysilane
gamma-mercaptopropyltrimethoxysilane
gamma-aminopropyltriethoxysilane
gamma-aminopropyltriethoxysilane
N-beta(aminoethyl)-gamma-aminopropyltrimethoxysilane
methyl[2-(gamma-trimethoxysilypropylamino)ethylamino]3-propionate in methanol
modified amino-organosilane
ureido-silane
mercaptoethyltriethoxysilane, 0 to 3, and preferably 1 to 2, parts of a filler selected from the class consisting of fumed silica and alumina and 7.5 parts of a binder system composed of an acidified aminoethylated vinyl interpolymer having interpolymer pendant groups of carboxyloxy (polyalkylamine) where the number of alkylamine groups ranges from 1 to about 2.5 and the interpolymer has aminoethylation containing at least 3 percent by weight of pendant carboxylic groups, and further wherein said aminoethyl groups are reacted with sufficient acid to impart water solubility to said interpolymer, and an epoxy resin.

The scope of this invention and its advantages can be more readily appreciated and understood by reference to the following representative examples where all parts and percentages are by weight unless otherwise designated.

The ingredients in the recipes of Table I were mixed essentially simultaneously and then were ready to be coated on an optical member such as stretched acrylic by brush, flow or dip coating to give a coating, preferably of 1 to 10 microns, with thick coatings being useful in some instances. This coating was allowed to air dry and then was heated, preferably to 88° C., for 16 hours to harden or cure the composition on the optical member, which was stretched acrylic.

TABLE I

COATING FORMULATIONS IN PARTS BY WEIGHT

| Components | Commercial Designations | Coating Recipe No. 188 | No. 210 | No. 215 |
|---|---|---|---|---|
| Epoxy binder | XD-7080/DER 332[1] | 7.5 | 7.5 | 7.5 |
| Prehydrolyzed ethyl silicate | Silbond H-4[2] | 5.7 | 5.7 | 5.7 |
| Polysilicic acid | (Derived from TEOS)* | 25.1 | 25.1 | 25.1 |
| Glacial acetic acid | — | 29.4 | 29.4 | 29.4 |
| Filler | Aluminum Oxide "C"[3] or EH-5[4] | 0 | 21.0 (1.98% EH-5)* | 18.8 (2.5% Aluminum Oxide C) |
| Water | — | 29.4 | 8.4 | 10.6 |
| Silane | A-187[5] | 2.9 | 2.9 | 2.9 |
| | | 100.0 | 100.0 | 100.0 |

[1]Dow Chemical Company indicated XD-7080 is made according to teachings of U.S. Pat. No. 3,719,629 and is an aminoethylated polymer and an acryl monomer in a glycol ether and DER 332 is an epoxy resin of bisphenol A type.
[2]Stauffer Chemical Company
[3]DeGussa Inc.
[4]Cabot Corporation
[5]Union Carbide Corporation
*TEOS - tetraethyl ortho silicate It is preferred that polysilicic acid be produced by mixing 83.7 parts of tetraethyl ortho silicate with 16.3 parts of 15 percent aqueous hydrochloric acid and allowed to stand 24 hours before using in the above recipes. When the epoxy resin is diglycidyl ester of bisphenol A and the silane is gamma glycidoxy propytrimethoxy silane, i.e., A-187, in the above recipes exceptionally good results are obtained.

U.S. Pat. No. 3,719,629 describes how to make the interpolymer useful as a binder in this invention and is specifically incorporated hereby in this specification. This patent characterizes the interpolymer as an acidified aminoethylated interpolymer having pendant amino alkylate groups of the formula

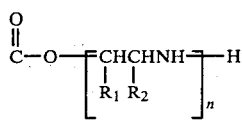

wherein $R_1$ and $R_2$ are independently selected from the group consisting of hydrogen and lower alkyl radicals of one to four carbon atoms and the average value of n within the range of from about 1.0 to about 2.5, and wherein the interpolymer before aminoethylation contains at least about 3 percent and preferably more than 5 percent by weight pendant —COOH groups. The invention also contemplates the utilization of these acidified polymers in water miscible solvents in the formulation of a complete coating composition. The invention also contemplates the utilization of these acidified polymers in water dispersible epoxy resin coating compositions.

The aminoethylated interpolymers are acidified by simple mixing of the interpolymer and acid in a suitable water miscible solvent or solvent blend. Among such solvents are the lower alkyl ethers of ethylene, propylene, dipropylene and like glycols representative of which are the butyl ether of propylene glycol, the ethyl ether of ethylene glycol, the propyl ether of diethylene glycol, and an isobutyl ether of mixed propylene glycols. Other solvents will be known.

The useful acids are those that will form an acid salt with the pendant amine moieties of the interpolymer. Preferably the acid should be volatile. Thus, typical of the preferred species are formic and acetic acids. The less volatile acids, such as glycolic acid, propionic acid, butyric acid and the like may be used but the water resistance of the resultant coating is impaired. Inorganic acids such as phosphoric acid may also be employed.

The acid may be used in an amount to neutralize all of the amine groups and may be employed in excess of that amount or less than that amount. The minimum level to be used is that which will impart water dispersibility to the acidified aminoethylated interpolymer.

While certain representative embodiments and details have been shown for the purpose of illustrating the invention it will be apparent to those skilled in this art that various changes and modifications may be made therein without departing from the spirit or scope of the invention.

What is claimed is:

1. A hydrolytically stable, hard, transparent coating on an acrylic or polycarbonate optical member comprising an optical member having a coating of 1 to 10 microns thereon, said coating comprising a cured composition formed from a dispersion coating of a mixture by weight of 0 to about 30 parts of prehydrolyzed alkyl silicate, where said alkyl radical contains 1 to 10 carbon atoms, 0 to about 30 parts of polysilicic acid, 0 to about 50 parts of a monocarboxylic acid having 1 to 2 carbon atoms, 0 to about 50 parts of water, 1 to 5 parts of a silane, 0 to about 3 parts of a filler selected from the class consisting of fumed silica and alumina, in a binder system composed of epoxy resin and an acidified aminoethylated vinyl interpolymer having interpolymer pendant groups of carboxyloxy (polyalkylamine) wherein the number of alkylamine groups ranges from 1 to about 2.5 and the interpolymer has aminoethylation containing at least 3 percent by weight of pendant carboxylic groups, said aminoethyl groups being reacted with sufficient acid to impart water solubility to said interpolymer, said silane being selected from the class consisting of chloropropyltrimethoxysilane, vinyltrichlorosilane, vinyltriethoxysilane, vinyl-tris(2-methoxyethoxy)silane, gamma-methacryloxypropyl-tris-(2-methoxyethoxy)silane, beta-(3,4-epoxycyclohexyl)-ethyltrimethoxysilane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-aminopropyltrimethoxysilane, methyl[2-(gamma-trimethoxysilypropylamino)ethylamino]3-propionate in methanol, modified aminoorganosilane, ureido-silane and mercaptoethyltriethoxysilane.

2. The hydrolytically stable, hard, transparent coating on an optical member of claim 1 wherein the binder system is comprised of an acrylic interpolymer and an epoxy resin with about 7.5 parts binder for 100 parts of ingredients.

3. The optical member of claim 1 wherein the binder comprises an epoxy resin and an acrylic interpolymer.

4. The coating of claim 1 wherein the vinyl interpolymer contains pendant aminoethyl groups of the formula

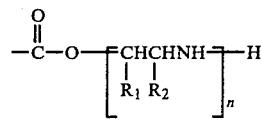

wherein $R_1$ and $R_2$ are independently selected from the group consisting of hydrogen and lower alkyl radicals of 1 to 4 carbon atoms and the average value of n ranges from about 1.0 to about 2.5 and wherein the interpolymer before aminoethylation contains 3 to 15 percent by weight pendant —COOH groups and further wherein said aminoethyl groups are reacted with sufficient acid to impart water solubility to said interpolymer and an epoxy resin, said interpolymer being dissolved in a water miscible solvent which is selected from the group consisting of aliphatic alcohols having about 1 to about 6 carbon atoms, glycols, and mixtures thereof.

5. The coating on the optical member of claim 4 wherein the glycol is a glycol monoether.

6. The coating of claim 1 wherein the silane is gamma glycidoxy propytrimethoxy silane.

7. The coating on the optical member of claim 1 wherein the member is a sheet.

8. A hydrolytically stable, hard, transparent coating on an acrylic or polycarbonate optical member comprising an optical member having a coating of 1 to 10 microns thereon, said coating comprising a cured composition formed from a dispersion coating of a mixture by weight of 0.5 to about 30 parts of prehydrolyzed alkyl silicate, where said alkyl radical contains 1 to 10 carbon atoms, about 0.5 to about 30 parts of polysilicic acid, about 0.5 to about 50 parts of a monocarboxylic acid having 1 to 2 carbon atoms, about 0.5 to about 50 parts of water, 1 to 5 parts of a silane, about 0.5 to about 3 parts of a filler selected from the class consisting of fumed silica and alumina, in a binder system composed of epoxy resin and an acidified aminoethylated vinyl interpolymer having interpolymer pendant groups of carboxyloxy (polyalkylamine) wherein the number of alkylamine groups ranges from 1 to about 2.5 and the interpolymer has aminoethylation containing at least 3 percent by weight of pendant carboxylic groups, said aminoethyl groups being reacted with sufficient acid to impart water solubility to said interpolymer, said silane being selected from the class consisting of chloropropyltrimethoxysilane, vinyltrichlorosilane, vinyltriethoxysilane, vinyl-tris(2-methoxyethoxy)silane, gamma-methacryloxypropyl-tris-(2-methoxyethoxy)silane, beta-(3,4-epoxycyclohexyl)-ethyltrimethoxysilane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-aminopropyltrimethoxysilane, methyl [2-(gamma-trimethylsilypropylamino)ethylamino] 3-propionate in methanol, modified amino-organosilane, ureidosilane and mercaptoethyltriethoxysilane.

* * * * *